United States Patent Office 3,488,225
Patented Jan. 6, 1970

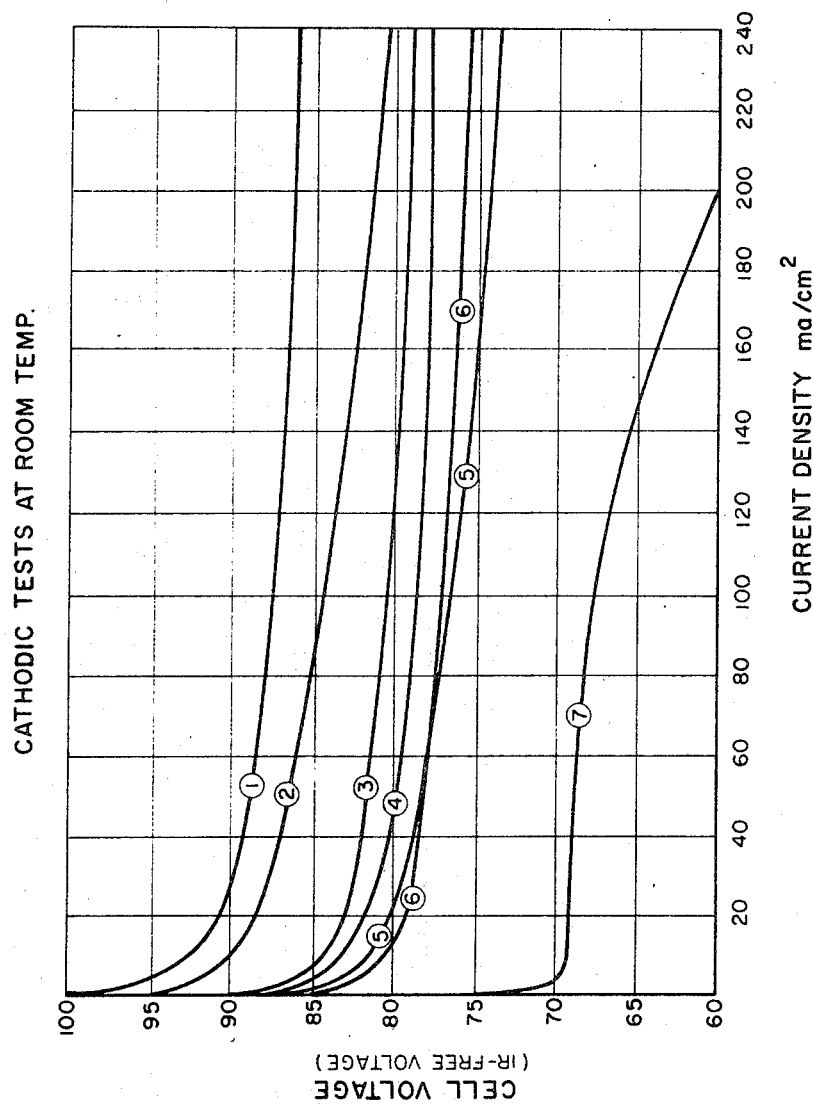

3,488,225
FUEL CELL COMPRISING METALLICALLY CATALYZED CARBON BLACK ELECTRODE AND PROCESS FOR FORMING SAME TO PRODUCE ELECTRICITY
Milton L. Selker, Shaker Heights, and Mieczyslaw P. Makowski, Willowick, Ohio, assignors to Clevite Corporation, a corporation of Ohio
Continuation-in-part of application Ser. No. 442,939, Mar. 26, 1965. This application June 22, 1967, Ser. No. 648,147
Int. Cl. H01m 13/02
U.S. Cl. 136—86          8 Claims

ABSTRACT OF THE DISCLOSURE

A fuel cell electrode composed of carbon black and a metal catalyst, in which the catalyst is added to the carbon black at the time of its formation by means of decomposition in an incomplete hydrocarbon combustion process. The resulting material is prepared in slurry form together with a binder, transferred on to a screen, drained, pressed and sintered. The electrode was tested in a fuel cell employing an asbestos matrix saturated with KOH.

---

This application is a continuation-in-part of U.S. application Ser. No. 442,939, filed Mar. 26, 1965, and now abandoned.

This invention relates generally to an electrode for use in a fuel cell and a method for making same and, more particularly, to an improved electrode in which the matrix material is composed of carbon black and the metal catalysts are intimately associated with the carbon black constituents.

Fuel cell electrodes composed of carbon and impregnated with iron, cobalt or nickel have already been described in the prior art. In electrodes of this type the carbon, for instance activated carbon, is impregnated with a liquid solution of a metal compound and combined with the carbon, in slurry form, for a time sufficient to effect adsorption of the metal on the carbon. Subsequent treatment releases the metal additive from its compound form. While the individual process differs somewhat from case to case, the procedure is essentially the same in that the carbon material is first formed and only subsequently combined with the metal additives. In a fuel cell electrode of this type the metal additive particles are metallurgically distinct and electron-microscopically identifiable.

The efficiency of such an electrode for fuel cell application is, at least in part, dependent upon the uniform distribution of the catalyst constituents within the carbon matrix. For this reason a special effort is made during the fabrication process to achieve a maximum degree of particle distribution.

In the present state of the art, fuel cell electrodes composed predominantly of platinum black are considered to provide superior, if not the best, performance characteristics. These electrodes however are prohibitively expensive in view of the rarity of the metal. Generally, fuel cell electrodes composed of carbon black and without additives establish a medium range performance level. The addition of metal additives to the carbon black, in the form of particles of the type which are relatively coarse in comparison to particles of the type herein under consideration, will slightly raise the performance level of the electrode.

It has now been discovered that when metal additives are added to the carbon black at the time of its formation, i.e. by substantially simultaneous thermal decomposition in an incomplete hydrocarbon combustion process, an electrode produced from such materials will reach a performance level which is substantially superior to the carbon black electrode discussed above. The reasons for this behavior are not as yet completely understood. It is believed that one contributing factor resides in the characteristics of the submicroscopic structure of the additives and the carbon black and more particularly their intimate and permanent association. An electron microscopic study and magnification of up to 80,600 ×, and resolution down to 60 angstrom, failed to distinguish any different looking subparticles in the metal containing carbon black. The additive particles are present in the form of metal ions such as in oxides and are in a state of very substantial subdivision and in very intimate association with the carbon black particles. It is quite apparent from these tests, that a very uniform distribution of the metal additives within the carbon black matrix is achieved. The uniformity of additives particle distribution is greater in this type of electrode as compared to one in which the carbon particles are impregnated by or physically mixed with some metal additives. One of the factors contributing to the high degree of uniformity is the relatively large surface area of both the additive and carbon particles achieved by the furnace decomposition process. The increased uniformity of distribution of these additives does, it is believed, contribute significantly to the improved output characteristics of the fuel cell electrode in accordance with this invention.

Carbon black per se is an amorphous form of carbon produced commercially by thermal-oxidative decomposition of hydrocarbons. It is primarily used in the manufacture of rubber goods, pigments, printers ink and the like. The physical properties of carbon black differ somewhat from the graphite and diamond forms of carbon because of the irregular arrangement of the carbon atoms. It is not known in what way, if any, this structural difference contributes to the effectiveness of this invention.

There are principally three manufacturing processes for producing carbon black. They are generally referred to as contact, thermal and the furnace method. The processes per se are well known in the art. Generally, in the contact and the thermal process, natural gas is utilized and decomposed. In recent years hydrocarbon oil has been the principal feed fuel for the furnace process. The electrode in accordance with this invention may be produced by any one of these processes although only the furnace process is described herein and is believed to have features which are advantageous for producing the desired carbon black.

It is well known that over 90% of the production of carbon black in this country is absorbed by the rubber industry with a fairly high percentage being used in tires. The carbon black is produced in great quantities and at relatively low cost. This factor is of significance inasmuch as practically all of the fuel cell electrodes produced today, in this country, are composed of materials which are rare and/or quite expensive. The appreciable cost of these materials has a retarding effect upon the growth of this relatively new industry.

An aspect of the present invention resides in a process for making an electrode and generating electricity therefrom. In this process finely divided metal compounds are reacted with vaporized hydrocarbons at an elevated temperature in a controlled atmosphere to cause partial decomposition of the hydrocarbons and decomposition of the metal compound and effecting the formation of metallic constituents and carbon black. The metallic constituents have catalytic characteristics and are in intimate association with a matrix of carbon black. Thereafter the material is formed into a coherent mass and the resulting electrode is used in a fuel cell to generate electricity.

Another aspect of the present invention resides in the provision of a fuel cell apparatus which includes an electrolyte containing member as well as an anode and cathode placed on opposite sides of this member. An oxygen containing reacting gas is placed in contact with the cathode and a hydrogen containing reacting fluid is in contact with the anode. The cathode is composed of material formed by reacting finely divided metal compounds with vaporized hydrocarbons at an elevated temperature in a controlled atmosphere to cause partial combustion of the hydrocarbons and decomposition of the metal compound thereby effecting formation of metallic constituents and carbon black. The metallic constituents have catalytic characteristics and are in intimate association with a matrix of carbon black.

It is therefore the principal object of this invention to provide a carbon black fuel cell electrode which has superior output characteristics.

It is another object of this invention to provide a fuel cell electrode which is composed of materials which are readily available at low cost and thus may significantly affect the price structure of fuel cell electrodes.

For a better understanding of the present invention, together with other and further objects thereof, reference is had to the following description taken in connection with the accompanying drawings, and its scope will be pointed out in the appended claims.

In the single figure the diagram illustrates electrode performance plots of cell voltages as a function of current densities at room temperature.

The full cell electrode in accordance with this invention is produced as follows. A hydrocarbon fuel, for instance heavy petroleum oil, is mixed with a compound of a metal, the latter having suitable catalytic properties. The following is a representative group of such materials.

TABLE I

| Catalytic metals: | Group of periodic table |
| --- | --- |
| Iron, cobalt, nickel | VIII |
| Manganese | VII |
| Molybdenum | VI |
| Vanadium | V |

The metal compounds are preferably in a suitably subdivided state and may be in the form of compounds with oxygen or sulfur. The additive containing hydrocarbon fuel is then sprayed under pressure in vapor form, or otherwise injected into a combustion chamber of a furnace having a controlled atmosphere. The vaporized fuel is subjected to elevated temperatures generally 1300 to 1500° F. which causes combustion of the hydrocarbon raising the temperature to 2000 to 3000° F. and effecting decomposition of the unburned hydrocarbon particles, leaving ultra fine carbon black powders which are intimately and permanently associated with the metal additive materials. It is believed that the metal compound additives are decomposed during the reaction step and are embodied in the carbon black matrix as metal ions such as in oxides etc.

The volatile components of the fuel mixture are allowed to escape or volatilize. Thereafter water, or steam, spray is applied to quickly cool the hot reaction products and then the ultra fine divided particles are recovered by suitable collection devices.

A water slurry is then prepared by adding water to the additive containing carbon black material. Thereto is added a binder, such as polytetrafluoroethylene in a suitable amount. These components are mixed vigorously in a high speed blender. The resulting slurry is transferred onto a fine mesh screen for draining off the water. The powders on the screen are then pressed together for a short time at a pressure of several hundred p.s.i. The pressed powder mass is thereafter sintered in a suitable furnace having a nitrogen atmosphere and under temperature conditions ranging preferably between 300 and 320° C. After several minutes in the furnace, the furnace is cooled to 100° C. and thereafter the finished electrode is removed therefrom. The thickness of the electrode prepared by this method varies, approximately, between 0.015" and 0.025", depending upon the amounts of carbon black used per unit area and the pressure employed.

In the preferred embodiment, the additive containing carbon black has a specific surface area of about 140 square meters per gram before processing. The concentration of additives is approximately between 3 and 30%. Electron microscope studies indicate that the powder particle size is less than 200 angstroms. The amount of polytetrafluoroethylene present in the electrode above described is substantially between 5 and 15 milligrams per square centimeter of electrode.

The fuel cell electrodes above described have been tested under conditions and with results as next described. A number of 2" x 2" electrodes were tested, short-term, on their electrochemical performance as oxygen electrodes (cathode) in a test hydrogen-oxygen fuel cell employing an asbestos matrix about 0.020 inch thick and saturated with 30% KOH. The electrodes (cathode and anode) were pressed against the matrix and exposed to reacting gases, i.e., such as hydrogen or oxygen, which were contained in the fuel cell by suitable and conventionally known nickel end plates. The gases were passed through the cell in amounts exceeding those required by the stoichiometry of the reaction. These tests were carried out at atmospheric pressures or at slight over-pressures, up to two p.s.i.g.

FIGURE 1 shows typical performance plots of cell voltages as a function of current density at room temperature. The performance characteristics were obtained with cells in which the hydrogen electrode (anode) was a standard platinum black electrode containing 10 milligrams platinum per square centimeter of electrode. For comparative purposes a standard carbon black electrode (cathode) was utilized. This electrode was composed of plain carbon black and a minor amount of polytetrafluoroethylene and contained no additive. The test electrodes in accordance with this invention contained carbon black with a specific surface area of approximately 143 square meter per gram. The following table indicates the type and amount of metal additive used in the test electrodes and correlates the data to the performance characteristics of each individual electrode shown in the drawing. The percentages indicated are those of the starting material before fabrication of the electrode.

TABLE II

| Electrode No. | Catalytic Metals | Amount, weight percent |
| --- | --- | --- |
| 1 | Platinum | 100 |
| 2 | Manganese | 20 |
| 3 | Cobalt | 19 |
| 4 | Cobalt-molybdenum | 10 |
| 5 | Nickel | 17 |
| 6 | Vanadium | 10 |
| 7 | | |

The number 7 electrode, tested for comparative purposes only, was carbon black without any metal additive.

It is quite obvious from the test results that even at room temperature the electrodes in accordance with this invention provide a significantly greater voltage and are capable of performance at higher current densities than the carbon black electrode and in some cases almost approach the performance level of the platinum black electrode.

A fuel cell, as the term is used herein, is an electrochemical cell which converts the free energy of reactants into electrical energy and in which one or both of the reactants are derived from a source located external to the cell as distinguished from a battery in which both reactants are stored within the electrodes.

While there have been described what are at present considered to be the preferred embodiments of this invention, it will be obvious to those skilled in the art that various changes and modifications may be made

What is claimed is:

1. A process for making an electrode and generating electricity therefrom, comprising the steps of: reacting finely divided metal compounds with vaporized hydrocarbons at an elevated temperature in a controlled atmosphere to cause partial combustion of said hydrocarbons and decomposition of the metal compound thereby effecting the formation of metallic constituents and carbon black, said metallic constituents having catalytic characteristics and being in intimate association with a matrix of carbon black; forming said materials into a coherent mass; and using the resulting electrode in a fuel cell to generate electricity.

2. A process for making an electrode and generating electricity therefrom according to claim 1, wherein the particles constituting said coherent mass exhibit a predominantly amorphous structure.

3. A process for making an electrode and generating electricity therefrom according to claim 1, wherein said metallic constituents are selected from a group of materials consisting essentially of nickel, iron, cobalt, manganese, molybdenum, vanadium or mixtures thereof.

4. A process for making an electrode and generating electricity therefrom according to claim 1, wherein the forming of said materials into a coherent mass comprises the preparation of a water slurry of said materials and adding thereto a binder material; mixing the components of said slurry in a blender; transferring said slurry on a fine mesh screen; draining off the water from the slurry; pressing the powder particles to a coherent mass with the screen; and sintering said mass in a controlled atmosphere and at a temperature between 300 and 320° C.

5. A process for making an electrode and generating electricity therefrom according to claim 4, wherein said coherent mass is sintered in a furnace and the powder mass is heated therein for a predetermined period of time and thereafter the furnace is cooled to 100° C. and the finished electrode is then removed.

6. In a fuel cell apparatus comprising an electrolyte containing member; an anode and a cathode placed on opposite sides of said member; an oxygen containing reacting gas in contact with said cathode; a hydrogen containing reacting fluid in contact with said anode; said cathode being composed of material formed by reacting finely divided metal compounds with vaporized hydrocarbons at an elevated temperature in a controlled atmosphere to cause partial combustion of said hydrocarbons and decomposition of the metal compound thereby effecting the formation of metallic constituents and carbon black, said metallic constituents having catalytic characteristics and being in intimate association with a matrix of carbon black.

7. Apparatus according to claim 6, wherein said metallic constituents are selected from a group of materials consisting essentially of nickel, iron, cobalt, manganese, molybdenum, vanadium or mixtures thereof.

8. An apparatus according to claim 6, wherein said electrolyte is a potassium hydroxide base solution.

References Cited

UNITED STATES PATENTS

| | | | |
|---|---|---|---|
| 1,999,573 | 4/1935 | Odell | 23—209.5 X |
| 2,503,291 | 4/1950 | Odell | 23—209.5 X |
| 3,213,026 | 10/1965 | Jordan et al. | 23—209.4 X |
| 3,311,505 | 3/1967 | Paget et al. | 136—120 X |
| 3,320,093 | 5/1967 | Harding et al. | 136—122 |

WINSTON A. DOUGLAS, Primary Examiner

O. F. CRUTCHFIELD, Assistant Examiner

U.S. Cl. X.R.

29—182.3; 75—208; 136—120, 121, 122